(12) United States Patent
Lee et al.

(10) Patent No.: US 9,566,909 B2
(45) Date of Patent: Feb. 14, 2017

(54) VEHICLE CONTROL SYSTEM FOR PROVIDING WARNING MESSAGE AND METHOD THEREOF

(71) Applicant: KYUNGPOOK NATIONAL UNIVERSITY INDUSTRY-ACADEMIC COOPERATION FOUNDATION, Bukgu, Daegu (KR)

(72) Inventors: Minho Lee, Daegu (KR); Jihun Kim, Daegu (KR)

(73) Assignee: KYUNGPOOK NATIONAL UNIVERSITY INDUSTRY-ACADEMIC COOPERATION FOUNDATION, Burkgu, Daegu (KR)

( * ) Notice: Subject to any disclaimer, the term of this patent is extended or adjusted under 35 U.S.C. 154(b) by 0 days.

(21) Appl. No.: 14/562,996

(22) Filed: Dec. 8, 2014

(65) Prior Publication Data

US 2015/0158427 A1    Jun. 11, 2015

(30) Foreign Application Priority Data

Dec. 9, 2013    (KR) .......... 10-2013-0152138

(51) Int. Cl.
*B60Q 9/00*        (2006.01)
*G02C 11/00*       (2006.01)

(52) U.S. Cl.
CPC .......... *B60Q 9/008* (2013.01); *G02C 11/10* (2013.01)

(58) Field of Classification Search
CPC .......... B60Q 9/00; B60Q 9/008; B60T 7/22; B60W 30/09; B61L 27/0016; G02C 11/10
USPC .......... 701/1, 301, 302
See application file for complete search history.

(56) References Cited

U.S. PATENT DOCUMENTS

| | | | | |
|---|---|---|---|---|
| 7,135,993 B2 * | 11/2006 | Okamoto | ........... | G01C 21/365 340/426.19 |
| 7,592,920 B2 * | 9/2009 | Kopf | ........... | B60Q 9/008 340/425.5 |
| 7,598,927 B2 * | 10/2009 | Yamazaki | ........... | G02B 27/01 345/4 |
| 8,108,083 B2 * | 1/2012 | Kameyama | ........... | G01C 21/3641 180/272 |
| 8,135,507 B2 * | 3/2012 | Okabe | ........... | A61B 5/165 180/272 |

(Continued)

FOREIGN PATENT DOCUMENTS

DE    10324841 A1 *  12/2004  ........... A61B 3/112

*Primary Examiner* — Atul Trivedi
(74) *Attorney, Agent, or Firm* — Ohlandt, Greeley, Ruggiero & Perle, LLP

(57) ABSTRACT

A vehicle control system mounted on a vehicle is provided. The vehicle control system includes a first sensor configured to sense a driver's pupil size and gaze, a second sensor configured to sense an external object which exists in a peripheral region of the vehicle, a controller configured to sense lane change intention according to a change of the pupil size and the gaze, and in response to the lane change intention being sensed, control the second sensor to sense whether the external object exists in a direction of a lane to be changed, and an output unit configured to, in response to the external object existing in the direction of the lane to be changed, output a warning message.

13 Claims, 10 Drawing Sheets

(56) References Cited

U.S. PATENT DOCUMENTS

| | | | | |
|---|---|---|---|---|
| 8,725,311 B1* | 5/2014 | Breed | ............... | G08B 21/06 600/300 |
| 2003/0169213 A1* | 9/2003 | Spero | ............... | G02B 5/20 345/7 |
| 2004/0145496 A1* | 7/2004 | Ellis | ............... | A61H 3/061 340/905 |
| 2005/0131588 A1* | 6/2005 | Kuge | ............... | B60W 40/09 701/1 |
| 2005/0273264 A1* | 12/2005 | Gern | ............... | B62D 15/029 701/301 |
| 2007/0005245 A1* | 1/2007 | Ellis | ............... | A61H 3/061 701/469 |
| 2007/0021876 A1* | 1/2007 | Isaji | ............... | B60K 28/066 701/1 |
| 2007/0106475 A1* | 5/2007 | Kondoh | ............... | B60K 26/021 701/301 |
| 2007/0182528 A1* | 8/2007 | Breed | ............... | B60Q 9/008 340/435 |
| 2008/0119994 A1* | 5/2008 | Kameyama | ............... | B60W 40/08 701/48 |
| 2008/0234899 A1* | 9/2008 | Breed | ............... | B60N 2/002 701/47 |
| 2008/0300755 A1* | 12/2008 | Madau | ............... | B60R 1/00 701/49 |
| 2009/0037104 A1* | 2/2009 | Basson | ............... | G08G 1/166 701/431 |
| 2010/0253526 A1* | 10/2010 | Szczerba | ............... | B60K 28/066 340/576 |
| 2011/0178680 A1* | 7/2011 | Kato | ............... | B60N 2/002 701/41 |
| 2012/0212353 A1* | 8/2012 | Fung | ............... | B60K 28/06 340/905 |
| 2012/0271484 A1* | 10/2012 | Feit | ............... | B60W 50/14 701/1 |
| 2013/0226408 A1* | 8/2013 | Fung | ............... | B60W 40/09 701/41 |
| 2013/0335213 A1* | 12/2013 | Sherony | ............... | G08G 1/167 340/439 |
| 2014/0098008 A1* | 4/2014 | Hatton | ............... | G06T 11/00 345/8 |
| 2014/0168399 A1* | 6/2014 | Plummer | ............... | B60Q 9/00 348/78 |
| 2015/0092042 A1* | 4/2015 | Fursich | ............... | B60R 1/00 348/115 |
| 2015/0251663 A1* | 9/2015 | Yang | ............... | G08B 21/06 701/1 |
| 2015/0266486 A1* | 9/2015 | Silvlin | ............... | B60W 40/09 701/70 |
| 2015/0291093 A1* | 10/2015 | Iwai | ............... | G08G 1/166 340/995.27 |
| 2015/0296135 A1* | 10/2015 | Wacquant | ............... | G06F 3/012 348/207.11 |
| 2016/0103338 A1* | 4/2016 | Hart | ............... | G02C 11/10 351/206 |

\* cited by examiner

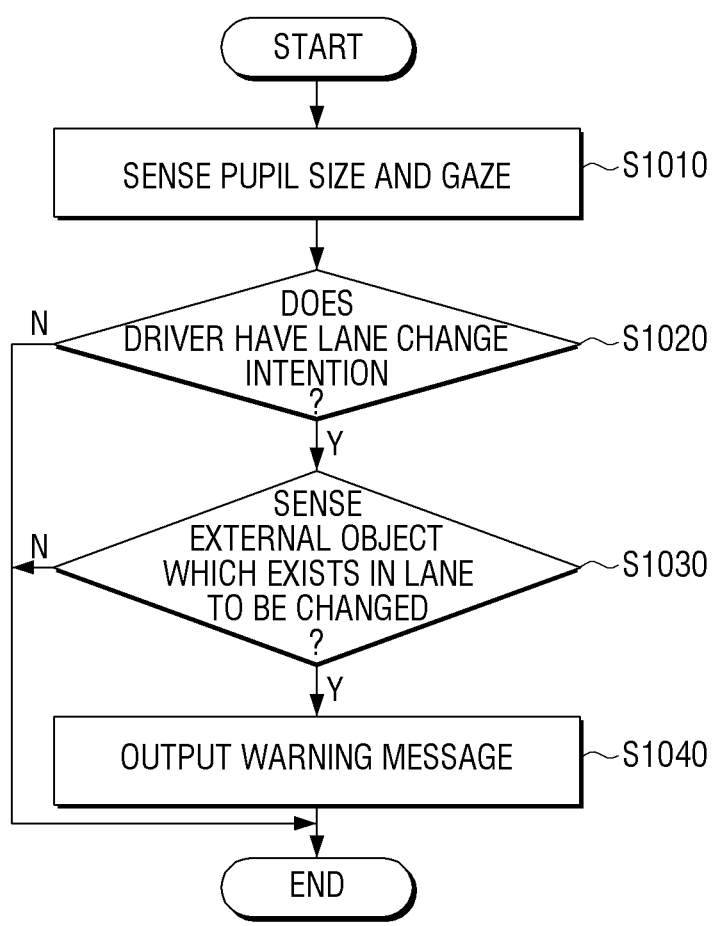

VEHICLE CONTROL SYSTEM FOR PROVIDING WARNING MESSAGE AND METHOD THEREOF

CROSS-REFERENCE TO RELATED APPLICATIONS

This application claims priority from Korean Patent Application No. 10-2013-0152138, filed on Dec. 9, 2013 in the Korean Intellectual Property Office, the disclosure of which is incorporated herein by reference in its entirety.

BACKGROUND OF THE INVENTION

1. Field of the Invention

The present general inventive concept generally relates to a vehicle control system and a method thereof, and more particularly, to a vehicle control system which provides a driver with a warning message regarding a risk factor when a driver is to change a lane.

2. Description of the Related Art

With the development of a society, population has greatly increased, and various accidents, including a car accident, are happening continuously. As the number of vehicles have increased and the society have been complicated, a death rate due to a car accident has also greatly increased.

A car accident may occur due to various causes such as speeding, signal violation, driving while intoxicated (DWI), drive while drowsy, driver's inattention, etc. For example, as one of the most frequent accidents, a driver may not perceive another vehicle which approaches from an adjacent lane and collide with the vehicle when changing a lane. Specially, there are many accidents due to a surrounding vehicle which exists in a blind spot that a driver cannot see thorough a side-view mirror on a side of a driver's seat. Accordingly, there is a need for a method of preventing such accident.

SUMMARY OF THE INVENTION

The present disclosure has been provided to address the aforementioned and other problems and disadvantages occurring in the related art, and an aspect of the present disclosure provides a vehicle control system which determines a risk factor and provides a warning message automatically when a driver is to change a lane and a method thereof.

According to an exemplary embodiment, there is provided a vehicle control system mounted on a vehicle including: a first sensor configured to sense a driver's pupil size and gaze, a second sensor configured to sense an external object which exists in a peripheral region of the vehicle, a controller configured to sense lane change intention according to a change of the pupil size and the gaze, and in response to the lane change intention being sensed, control the second sensor to sense whether the external object exists in a direction of a lane to be changed, and an output unit configured to, in response to the external object existing in the direction of the lane to be changed, output a warning message.

In response to the pupil size increasing more than a predetermined threshold ratio and the gaze moving in a right direction or a left direction of the vehicle, the controller may determine that the driver has the lane change intention and settles a direction of the lane to be changed.

The first sensor may include a first camera configured to be mounted on a first side of eyeglasses that the driver wears to photograph the driver's eyes and transmit a first photograph image to the controller and a second camera configured to be mounted on a second side of the eyeglasses to photograph a direction in which the driver's face looks and transmit a second photograph image to the controller. In addition, the controller may determine a change of the driver's pupil size based on the first photograph image and determines the driver's gaze by comparing the first photograph image and the second photograph image.

The first sensor may include a camera configured to be mounted on a dashboard or a room mirror of the vehicle to photograph the driver's eyes.

The first sensor may include an Infrared Rays (IR) light source configured to provide IR lighting and at least one IR camera.

The second sensor may include at least one camera configured to photograph the peripheral region or at least one proximity sensor configured to sense an access status of the external object.

According to an exemplary embodiment, there is provided a method of controlling a vehicle of a vehicle control system mounted on a vehicle, the method including: determining lane change intention by sensing a driver's pupil size and gaze, in response to the lane change intention being sensed, sensing an external object which exists in a direction of a lane to be changed, and in response to the external object existing in the direction of the lane to be changed, outputting a warning message.

In response to the driver's pupil size increasing more than a predetermined threshold ratio and the gaze moving in a right direction or a left direction of the vehicle, the determining the lane change intention may include determining that the driver has the lane change intention and settling the direction of the lane to be changed.

The determining the lane change intention may include obtaining a first photograph image obtained by photographing the driver's eyes by using a first camera mounted on a first side of eyeglasses that the driver wears and obtaining a second photograph image obtained by photographing a direction in which the driver's face looks by using a second camera mounted on a second side of the eyeglasses.

The determining the lane change intention may further include determining a change of the driver's pupil size based on the first photograph image and determining the driver's gaze by comparing the first photograph image and the second photograph image.

The determining the lane change intention may include photographing the driver's eyes by using a camera mounted on a dashboard or a room mirror of the vehicle, determining the driver's pupil size and the gaze by analyzing a photograph image, and determining the lane change intention according to a change of the driver's pupil size and the gaze.

The determining the lane change intention may include photographing the driver's eyes by using an Infrared Rays (IR) light source configured to provide IR lighting and at least one IR camera, determining the driver's pupil size and the gaze by analyzing a photograph image, and determining the lane change intention according to a change of the driver's pupil size and the gaze.

The sensing the external object may include sensing the external object by using at least one camera configured to photograph the peripheral region or at least one proximity sensor configured to sense an access status of the external object.

According to the above various exemplary embodiments, the vehicle control system may automatically perceive a driver's lane change intention, sense a risk factor in a direction of lane to be changed, and provide the driver with a warning message immediately. Thus, it is possible to reduce a danger of accident when changing a lane.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 10 is a flowchart provided to describe a method of providing a warning message according to an exemplary embodiment.

DETAILED DESCRIPTION OF THE PREFERRED EMBODIMENT

Figure 1:
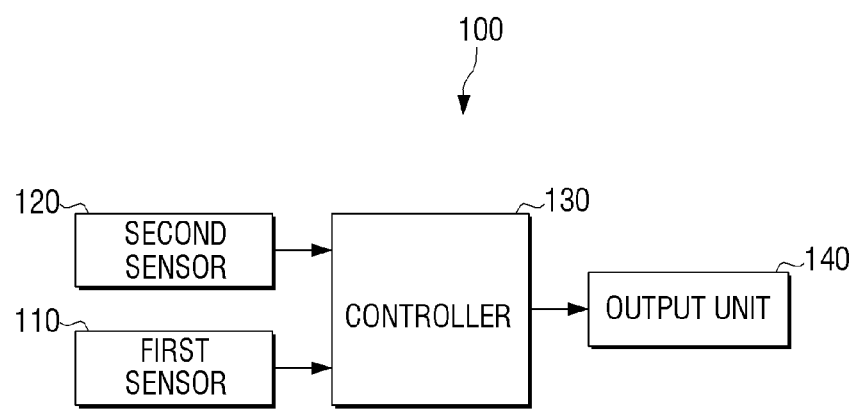
FIG. 1 is a block diagram illustrating a structure of a vehicle control system according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating a structure of a vehicle control system according to an exemplary embodiment. According to FIG. 1, a vehicle control system 100 includes a first sensor 110, a second sensor 120, a controller 130, and an output unit 140.

The first sensor 110 senses a driver's pupil size and gaze. The first sensor 110 may include a camera mounted on a position to photograph the driver's face. For example, in response to a driver wearing eyeglasses or a helmet, at least one camera may be mounted on the eyeglasses or the helmet to photograph the driver's face.

The second sensor 120 senses an external object which exists in a peripheral region of a vehicle. An external object may be various objects such as a surrounding vehicle, a person, and the like. The second sensor 120 may be implemented as a proximity sensor or a camera.

The controller 130 analyzes a photograph image photographed by the first sensor 110 and determines a change status of a driver's pupil size and gaze based on a result of the analysis. In addition, the controller 130 may determine whether the driver has a lane change intention according to a result of the determination. In response to determining that the driver has the lane change intention, the controller 130 may control the second sensor 120 to sense existence of an external object in a direction of a lane to be changed.

The output unit 140 outputs various messages. The output unit 140 may include a display, a speaker, and the like. Accordingly, the output unit 140 may output a visual message or an audio message. The display may be mounted on a center fascia of a vehicle in which the vehicle control system 100 is equipped. The display may be also implemented as a transparent display and be mounted on a front window, a side window, or a rear window of the vehicle.

In response to the existence of an external object in a direction of a lane to which the driver wishes to move, the controller 130 may control the output unit 140 to output a warning message. In addition, the controller 130 may consider a distance between the external object and the vehicle and only in response to determining that the external object exists within a predetermined distance, output a warning message.

In response to the driver's gaze moving toward a right side or a left side, not a front side, while the driver's pupil size increased more than a predetermined threshold ratio, the controller 130 may determine that the driver has the lane change intention. Accordingly, the controller 130 may settle a direction of a lane to be changed according to a moving direction of the driver's gaze.

Figure 2:
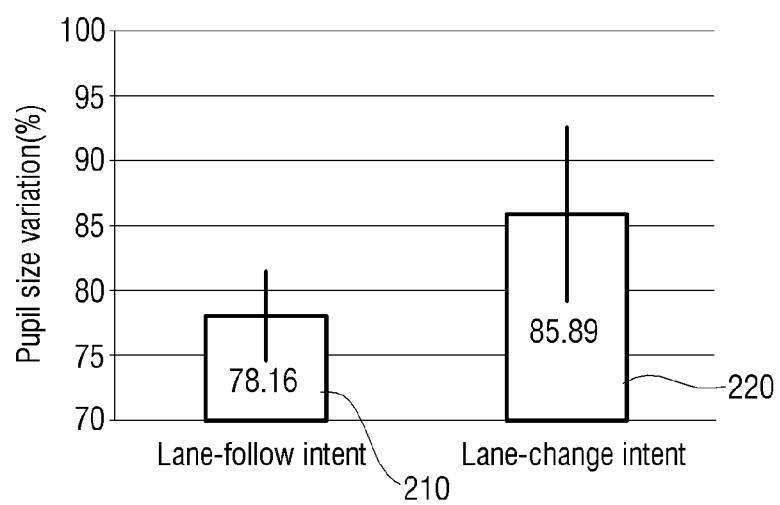
FIG. 2 is a graph illustrating a change of a driver's pupil size.

FIG. 2 is a graph illustrating a change of a driver's pupil size. A first graph 210 of FIG. 2 shows a pupil size when a driver drives in a straight line in a current lane, and a second graph 220 shows a pupil size when the driver changes a lane. According to the first and second graphs 210, 220, in case of general driving, a pupil size is calculated as approximately 78.16% with respect to a reference value, and in case of lane change, the pupil size is calculated as approximately 85.89% with respect to the reference value. The reference value may be set to be the driver's maximum pupil size or average pupil size. After photographing a usual face of the driver for a predetermined time, the controller 130 may extract a pupil size from the photograph image and calculate and pre-store a maximum size or an average size of the pupil. In general, a driver's concentration increases when changing a lane, and thus, the pupil size becomes relatively bigger as compared with a pupil size in the general driving.

In response to a threshold ratio being set to be 80% in an example of FIG. 2 and the pupil size being calculated more than 80%, the controller 130 may determine that an arbitrary event occurs and trace the driver's gaze.

Figure 3:
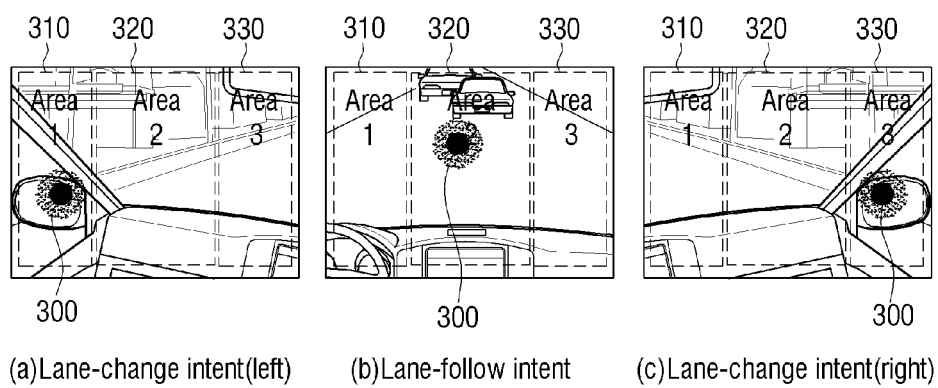
FIG. 3 is a diagram provided to describe a method of determining a lane change intention according to a change of a driver's gaze.

FIG. 3 is a diagram provided to describe a method of tracing a driver's gaze. FIG. 3 shows front images photographed in a direction of the driver's face in a case (a) that a driver looks to the left, a case (b) that the driver looks ahead, and a case (c) that the driver looks to the right. Each image may be divided into three areas of a first area 310, a second area 320, and a third area 330. In addition, in each image, a graphic object 300 corresponding to a direction of the driver's pupil, that is, a direction of the gaze is displayed.

For example, in response to a driver changing a lane to a left lane, the driver turns his/her eyeballs to the left with turning his/her face to the left to some degree. Accordingly, the graphic object 300 corresponding to a direction of the driver's gaze is formed in the first area 310. In response to sensing that the gaze turns to the first area 310 while the driver's pupil size exceeds a predetermined threshold ratio as shown in (a) of FIG. 3, the controller 130 may determine that the driver has an intention to change a lane to a left lane.

By contrast, in response to the driver changing a lane to a right lane, the driver turns his/her eyeballs to the right with turning his/her face to the right to some degree. Accordingly, the graphic object 300 corresponding to a direction of the driver's gaze is formed in a third area 330. In response to sensing that the gaze turns to the third area 330 while the driver's pupil size exceeds a predetermined threshold ratio as shown in (c) of FIG. 3, the controller 130 may determine that the driver has an intention to change a lane to a right lane.

In response to both of a change of the pupil size and a change of the gaze being sensed, the controller 130 may determine whether the driver has the lane change intention.

As described above, the driver's pupil size and gaze may be sensed by using the first sensor 110. The first sensor 110 may be formed on the eyeglasses that the driver wears.

Figure 4:
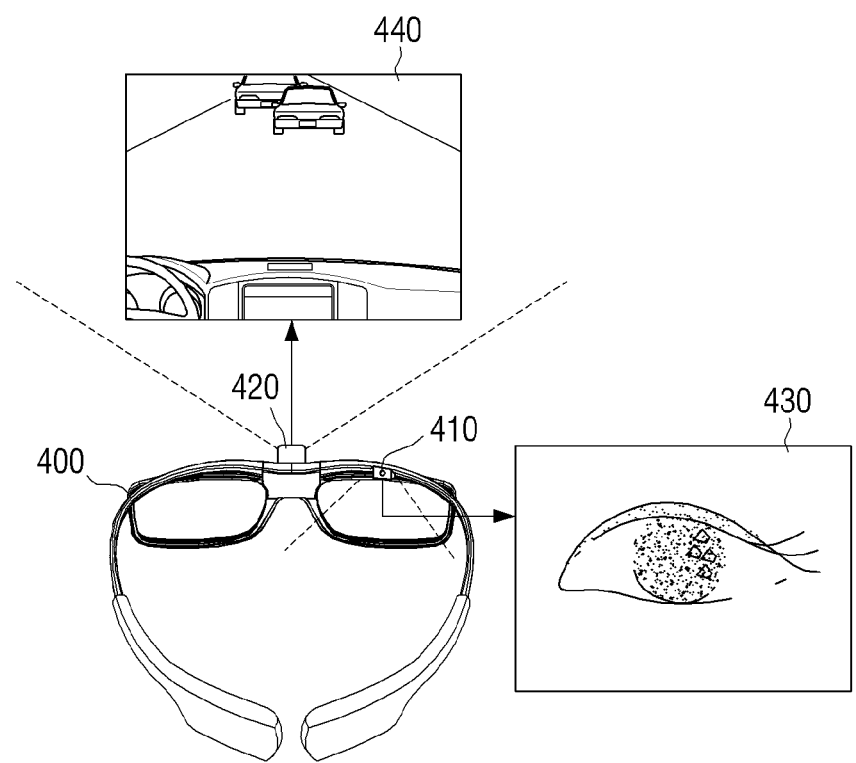
FIG. 4 is a diagram provided to describe an exemplary embodiment of determining a lane change intention by using a camera mounted on a driver's eyeglasses.

FIG. 4 is a diagram provided to describe an exemplary embodiment of determining a lane change intention by using a camera mounted on a driver's eyeglasses.

According to FIG. 4, the first sensor 110 includes a first camera 410 which is mounted on a first side of eyeglasses 400 that the driver wears and photograph the driver's eyes and a second camera 420 which is mounted on a second side of the eyeglasses 400 and photograph a direction to which the driver's face turns. In this case, the first side refers to a direction of the driver's eyes, and the second side refers to a direction of a front side of the driver. In FIG. 4, the first camera 410 is disposed on a upper side of a frame of a right eye of the eyeglasses 400, but a position and a shape of the first camera 410 may vary according to an exemplary embodiment.

The first camera 410 may transmit a photographed image, that is, a first photograph image 430 to the controller 130, and the second camera 420 may transmit a photographed image, that is, a second photograph image 440 to the controller 130. As shown in FIG. 4, the first photograph image 430 may be an image of a driver's eyes, and the second photograph image 440 may be an image of a front side of the driver's face.

Although it is not shown in FIG. 4, the eyeglasses 400 and a main body of the vehicle control system 100 may be connected in a wired manner or may be connected through a wireless communication interface. Specially, a communication chip for performing wireless communication, such as Bluetooth, Wireless-Fidelity (Wi-Fi), Zigbee, etc., may be embedded in the eyeglasses 400. The first camera and the second camera may transmit the first photograph image 430 and the second photograph image 440 to the controller 130 in a wired manner or in a wireless manner.

Meanwhile, according to an another exemplary embodiment, the first sensor 110 may include an IR light source which provide IR lighting and at least one IR camera. For example, in case of driving in cloudy weather due to rain or snow or in case of driving in a tunnel, an inside of a vehicle is dark, and thus, it may be difficult to trace the driver's pupil size and gaze accurately. In this case, it is possible to direct the IR lighting at a part of the driver's eyes by using the IR light source and photograph the driver's eyes by using the IR camera. That is, the above-described first camera 410 may be implemented as an IR camera.

Alternatively, the first camera 410 may be a camera array including both an IR camera and a common camera. In this case, the first photograph image may be obtained by selectively controlling one of the IR camera and the common camera by using an illumination intensity sensor (not shown) or a timer. That is, in response to determining that it is a night, the first photograph image may be obtained by using the IR camera, an in response to determining it is a day, the first photograph image may be obtained by using the common camera.

The controller 130 may determine a change of the driver's pupil size based on the first photograph image 430. Specially, the first photograph image 430 may be formed on a plurality of image frames. The controller 130 may detect a pupil part from each image frame, compare the number of pixels corresponding to the pupil part, and calculate the change of the pupil size.

In addition, the controller 130 may determine the driver's gaze by comparing the first photograph image 430 and the second photograph image 440.

Figure 5:
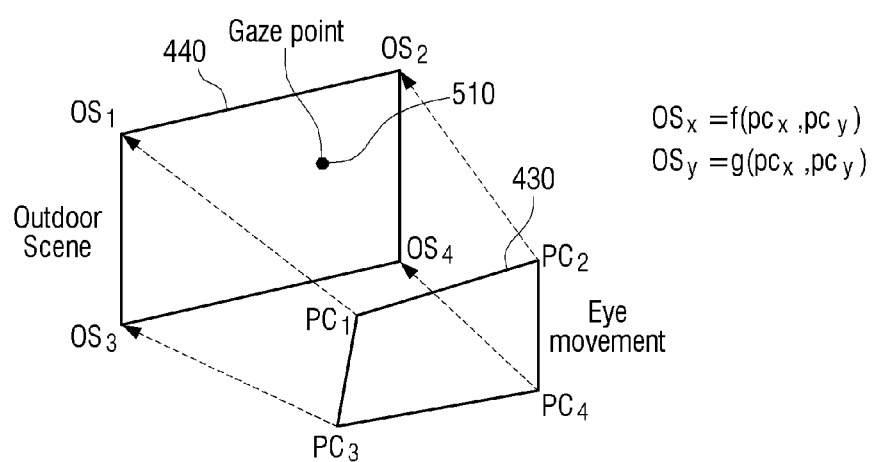
FIG. 5 is a diagram provided to describe a method of sensing a driver's gaze by comparing an image of a driver's eyeballs and an image of a front side.

FIG. 5 is a diagram provided to describe a method of determining a driver's gaze by comparing the first photograph image 430 and the second photograph image 440. The controller 130 determines a mapping function based on four edges PC1 to PC4 of the first photograph image 430 and four corners OS1 to OS4 of the second photograph image 440. That is, in response to a location coordinate of pupils in the first photograph image 430 being PCx and PCy, a coordinate of a point which is mapped onto the pupils in the second photograph image 440, that is, a coordinate of a gaze point 510 is set to be (OSx, OSy)=(f(PCx, PCy), g(PCx, PCy)). The mapping functions f( ) and g( ) may be implemented as a linear function of determining a mapping point by considering a distance ratio of each corner, but not limited thereto.

Figure 6:
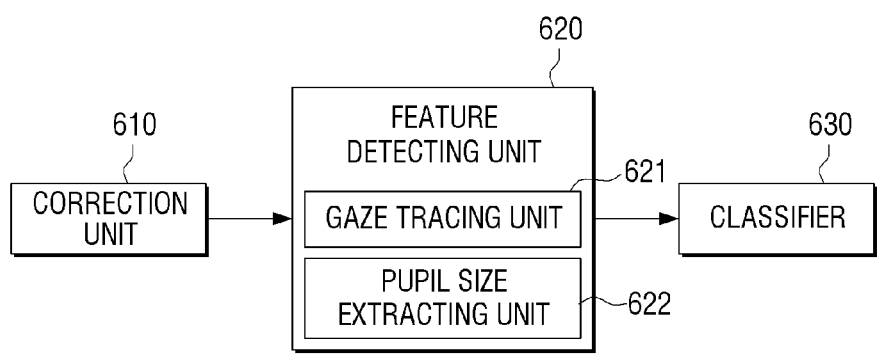
FIG. 6 is a diagram illustrating an example of a specific configuration of a controller for determining a lane change intention.

Meanwhile, the controller 130 may perform an image processing operation with respect to the first photograph image in order to increase accuracy. FIG. 6 is a diagram illustrating an example of a specific configuration of a controller for performing the image processing operation.

According to FIG. 6, the controller 130 includes a correction unit 610, a feature detecting unit 620, and a classifier 630. The correction unit 610 performs a correction operation for clarifying the pupil part in the first photograph image obtained by photographing the driver's eyes.

The feature detecting unit 620 detects features, such as a size or a location of the pupils, from the first photograph image and extracts a direction of the gaze and the pupil size based on the features. The feature detecting unit 620 includes a gaze tracing unit 621 and a pupil size extracting unit 622.

The gaze tracing unit 621 extracts the pupil part from the first photograph image, and as described in connection with FIG. 5, extracts a direction of a driver's gaze by comparing the first photograph image and the second photograph image.

The pupil size extracting unit 622 respectively extracts a pupil part from a plurality of first photograph images and detects a change ratio of the pupil size by comparing a size of the extracted pupil parts.

The classifier 630 combines results obtained by operations of the gaze tracing unit 621 and the pupil size extracting unit 622 and determines whether the driver has an intention of maintaining a current lane or has an intention of changing a lane.

The components illustrated in FIG. 6 may be implemented as software. For example, although it is not illustrated in FIG. 1, the vehicle control system 100 may further include a flash memory or a non-volatile memory. The non-volatile memory may include programs corresponding to respective components such as those shown in FIG. 6. In addition, the controller 130 may include a Central Processing Unit (not shown) and a Random Access Memory (RAM). The CPU of the controller 130 may copy the above-described programs stored in the non-volatile memory into the RAM, execute the copied programs, and automatically determine whether the driver has an intention of changing a lane.

Figure 7:
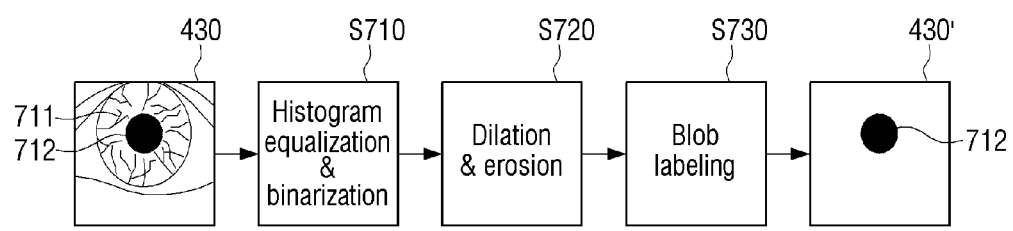
FIG. 7 is a diagram provided to describe a method of extracting a pupil part from an image of a driver's eyeballs.

FIG. 7 is a diagram provided to describe an example of an operation of the correction unit 610 from among the components of FIG. 6. According to FIG. 7, the driver's eyes photographed in the first photograph image 430 include an iris part 711 and a pupil part 712. In response to an input of such first photograph image 430, the correction unit 610 performs a Histogram equalization operation and a binarization operation (S710). Accordingly, the pupil part 712 may be further emphasized as compared with the adjacent iris part 711.

Subsequently, the correction unit 610 performs a dilation operation and an erosion operation (S720). The erosion operations performs a role of replacing a smallest value in a predetermined area with a value in a central part of a pixel. As described above, in a binarization status, a white area in an image decreases, and a black area increases. By contrast, the dilation operation performs a role of a filter of a maximum value. In response to the erosion operation, small lump of objects disappear, and in response to the dilation operation being performed, small holes in the objects disappear. As the result, noise may be removed.

Subsequently, the correction unit 610 may perform a blob labeling operation (S730). The blob labeling refers to a method of allocating the same label to adjacent pixels and allocating different label to disconnected components thereby cutting off a certain object from an image. Accordingly, an image 430' including only the pupil part 712 may be obtained.

The correction method described in connection with FIG. 7 is merely an example, and different methods may be performed in other exemplary embodiments.

Figure 8:
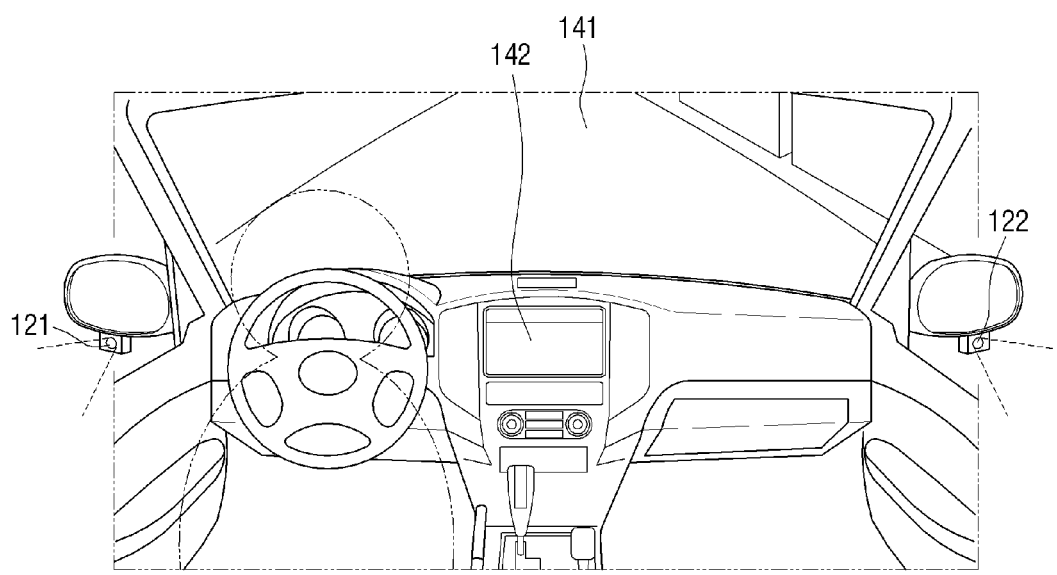
FIG. 8 is a diagram illustrating an example of a method of outputting a warning message.

FIG. 8 is a diagram provided to describe an operation of a vehicle control system which provides a warning message generated in a form of a visual message.

As described above, the second sensor 120 may include a camera or a proximity sensor.

FIG. 8 illustrates an example in which a vehicle control system includes cameras 121, 122 which is respectively attached to lower parts of a left side-view mirror and a right side-view mirror. The cameras 121, 122 may transmit a photographed image to the controller 130 of the vehicle control system 100 through a wired or wireless communication interface. In response to determining that the driver has a lane change intention, the controller 130 performs a photographing operation by selectively driving a camera in a direction of a lane to be changed and determines whether there is an external object in the lane to be changed by analyzing the photographed image. Specially, the controller 130 divides each of a plurality of images which were consecutively photographed into a plurality of blocks and calculates a pixel representative value of each divided block. In response to the blocks having pixel representative values in a similar range existing consecutively, the controller 130 may connect and recognize the blocks as a single external object. Accordingly, the controller 130 may determine existence of an external object and a distance between vehicles. In addition, the controller 130 may compare the pixel representative values of the corresponding blocks in each image and calculate a moving speed of an approaching external object.

On top of the above, the second sensor 120 may sense an external object by using a proximity sensor or a camera disposed on various positions such as a rear or a side of a vehicle.

The controller 130 may determine whether there is an external object which might cause a collision hazard in the direction of the lane to be changed.

In response to determining that there is an external object in the lane to be changed, the controller 130 may output a warning message 30 by using the output unit 140. FIG. 8 illustrates an example in which the output unit 140 includes a transparent display 141 implemented as a front window of a vehicle. The transparent display 141 refers to a display panel which is formed of transparent materials such that external objects are reflected in the display. According to an exemplary embodiment, the transparent display 141 may be implemented in various types of display. Specially, the transparent display 141 may be implemented as one of a transparent Liquid Crystal Display (LCD) type, a transparent Thin-Film Electroluminescent Panel (TFEL) type, a transparent Organic Light-Emitting Diode (OLED) type, a projection type, and the like.

The transparent LCD type refers to a transparent display which is implemented by removing a backlight unit from a currently-used LCD device and employing a pair of polarizing plates, an optical film, a transparent thin-film transistor, a transparent electrode, and the like. The transparent LCD has a problem of deterioration of transmission degree due to use of a polarizing plate and an optical film and deterioration of optical efficiency due to use of surrounding light instead of a backlight unit, but has merits of implementing a large-scale transparent display. The transparent TFEL type refers to a device which uses an alternating current type-inorganic thin film EL display (AC-TFEL) which is formed of a transparent electrode, an organic fluorescent substance, and an insulator film. The AC-TFEL type refers to a display which operates in a manner that an accelerated electron excites a fluorescent substance by passing through an inside of an organic fluorescent substance thereby generating a light. In case of the transparent display 141 being implemented in a form of a transparent TFEL, the controller 130 may adjust an electron so as to be projected in an appropriate position thereby determining a position to display information. According to the transparency of the organic fluorescent substance and the insulator film, it is possible to implement a display having high transparency. On top of this, the transparent OLED type refers to a transparent display device using an OLED which is autonomously capable of emitting light. An organic light emitting layer is transparent, and thus, it is possible to implement a transparent display device by employing a transparent electrode for both electrodes. The OLED emits light in a manner that an electron and a positive hole are inserted from both side of the organic light emitting layer and the electron and the positive hole are combined in the organic light emitting layer. The transparent OLED device inserts an electron and a positive hole into a desired position and displays information based on such principle.

Meanwhile, in response to the vehicle control system 100 including a display panel 142 disposed on a center fascia of the vehicle, the above-described warning message 30 may be displayed through the display panel 142.

Alternatively, an audio signal for providing a warning message to a driver may be outputted through a speaker (not shown) disposed in the vehicle control system 100.

Meanwhile, in the above-described exemplary embodiment, the first sensor senses the driver's pupil size and gaze by using the first camera and the second camera disposed on the driver's eyeglasses. However, the location of the camera may vary.

For example, the first sensor 110 may include a camera which is mounted inside a vehicle and photograph a driver's eyes. Specially, the first sensor 110 may use a camera mounted on a dashboard or a room mirror of the vehicle.

Figure 9:
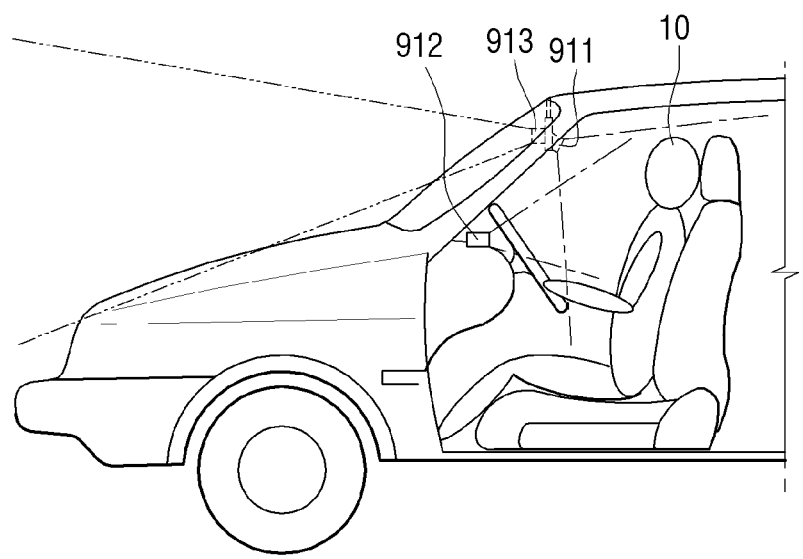
FIG. 9 is a diagram provided to describe an exemplary embodiment of determining a lane change intention by using a camera mounted inside a vehicle.

FIG. 9 is a diagram provided to describe such exemplary embodiment. According to FIG. 9, the first sensor 110 may include a first camera 911 mounted on a room mirror, a second camera 912 mounted on a dash board, and a third camera 913 mounted on the room mirror in an opposite direction of the first camera 911.

The first camera 911 and the second camera 912 are cameras for photographing a part of a driver's face. FIG. 9 shows an example in which the vehicle control system includes both of the first camera 911 and the second camera 912, but according to an exemplary embodiment, one of the first camera 911 and the second camera 912 may be mounted to photograph a face of a driver 10.

The third camera 913 is a camera for photographing a front side of a vehicle. The controller 130 may sense a direction of a driver's gaze by using an image photographed by the third camera 913 and an image photographed by at least one of the first camera 911 and the second camera 912.

Alternatively, the controller 130 may determine a driver's lane change intention by using only the image photographed by the third camera 913. For example, in response to a driver turning a steering wheel to the right in order to change a lane to a right lane, a position of a boundary line between the current lane and a right lane may move to a center of an image, in the image photographed by the third camera 913. In response to the driver's pupil size increasing more than a predetermined threshold ratio and the boundary line being moved more than a predetermined distance, the controller 130 may determine that the driver has the lane change intention.

As described above, the first sensor 110 may be implemented as a number of cameras disposed on various positions.

FIG. 10 is a flowchart provided to describe a method of providing a warning message according to an exemplary embodiment.

According to FIG. 10, the vehicle control system senses a change of a driver's pupil size and gaze in real time (S1010). The sensing method may vary as described above, and thus, the overlapped description will be omitted.

In response to determining that the driver has the lane change intention as the result of the sensing operation (S1020), the vehicle control system determines whether there is an external object in a direction of a lane to be changed (S1030).

In response to determining that there is an external object in the lane to be changed, the vehicle control system may output a warning message (S1040). As described above, a warning message may be provided by using a display panel or a transparent display mounted inside a vehicle or may be provided in a form of a sound message through a speaker.

Accordingly, even though the driver did not perceive an external object when changing a lane, the driver is able to recognize a hazard due to the adjacent external object immediately. Thus, an accident risk may decrease greatly.

Meanwhile, although it has been described that a method of providing a warning message is implemented as a vehicle control system, but the method of providing a warning message according to various exemplary embodiments may be applied to various transportation means such as a bicycle, a motor cycle, an airplane, a boat, and the like. Alternatively, the method may be applied to a system that may be used by a common driver. For example, according to another exemplary embodiment, the method may be implemented as an eyeglasses device including the first sensor 110, the second sensor 120, the controller 130, and the output unit 140 as shown in FIG. 1. In this case, it is possible to inform a driver in walking of a collision hazard due to an adjacent external object which moves at high speed.

The method of providing a warning message described in the above various exemplary embodiments may be performed by a program stored in non-transitory computer readable recording medium. The non-transitory computer readable recording medium refers to a medium which may store data permanently or semi-permanently rather than storing data for a short time such as a register, a cache, and a memory and may be readable by an apparatus. As an example, the above-described various applications and programs may be stored in the non-transitory computer readable recording medium such as a compact disc (CD), a digital versatile disk (DVD), a hard disk, a Blu-ray disk, a universal serial bus (USB), a memory card, a read-only memory (ROM), and the like, and provided therein.

Specially, a non-transitory computer readable recording medium having a program code for sequentially performing the steps of determining a lane change intention by sensing a driver's pupil size and gaze, sensing an external object which exists in a lane to be changed in response to the lane change intention, and outputting a warning message in response to existence of an external object in the lane to be changed.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A vehicle control system mounted on a vehicle comprising:
   a first sensor configured to sense a driver's pupil size and gaze; a second sensor configured to sense an external object which exists in a peripheral region of the vehicle;
   a controller configured to determine whether the driver has lane change intention according to a change of the pupil size and the gaze, and determining that the driver has the lane change intention, control the second sensor to sense whether the external object exists in a direction of a lane to be changed; and
   an output unit configured to, in response to the external object existing in the direction of the lane to be changed, output a warning message.

2. The vehicle control system as claimed in claim 1, wherein in response to the pupil size increasing more than a predetermined threshold ratio and the gaze moving in a right direction or a left direction of the vehicle, the controller determines that the driver has the lane change intention and settles a direction of the lane to be changed.

3. The vehicle control system as claimed in claim 2, wherein the first sensor comprises:

a first camera configured to be mounted on a first side of eyeglasses that the driver wears to photograph the driver's eyes and transmit a first photograph image to the controller; and a second camera configured to be mounted on a second side of the eyeglasses to photograph a direction in which the driver's face looks and transmit a second photograph image to the controller, wherein the controller determines a change of the driver's pupil size based on the first photograph image and determines the driver's gaze by comparing the first photograph image and the second photograph image.

4. The vehicle control system as claimed in claim 1, wherein the first sensor comprises:

a camera configured to be mounted on a dashboard or a room mirror of the vehicle to photograph the driver's eyes.

5. The vehicle control system as claimed in claim 1, wherein the first sensor comprises:

an Infrared Rays (IR) light source configured to provide IR lighting; and at least one IR camera.

6. The vehicle control system as claimed in claim 1, wherein the second sensor comprises at least one camera configured to photograph the peripheral region or at least one proximity sensor configured to sense an access status of the external object.

7. A method of controlling a vehicle by a vehicle control system mounted on the vehicle, the method comprising:

determining whether the driver has lane change intention by sensing a driver's pupil size and gaze;

in response to there being the lane change intention, sensing an external object which exists in a direction of a lane to be changed; and in response to the external object existing in the direction of the lane to be changed, outputting a warning message.

8. The method as claimed in claim 7, wherein in response to the driver's pupil size increasing more than a predetermined threshold ratio and the gaze moving in a right direction or a left direction of the vehicle, the determining the lane change intention comprises determining that the driver has the lane change intention and settling the direction of the lane to be changed according to a moving direction of the driver's gaze.

9. The method as claimed in claim 8, wherein the determining the lane change intention comprises:

obtaining a first photograph image obtained by photographing the driver's eyes by using a first camera mounted on a first side of eyeglasses that the driver wears; and obtaining a second photograph image obtained by photographing a direction in which the driver's face looks by using a second camera mounted on a second side of the eyeglasses.

10. The method as claimed in claim 9, wherein the determining the lane change intention further comprises:

determining a change of the driver's pupil size based on the first photograph image; and determining the driver's gaze by comparing the first photograph image and the second photograph image.

11. The method as claimed in claim 7, wherein the determining the lane change intention comprises:

photographing the driver's eyes by using a camera mounted on a dashboard or a room mirror of the vehicle;

determining the driver's pupil size and the gaze by analyzing a photograph image; and determining the lane change intention according to a change of the driver's pupil size and the gaze.

12. The method as claimed in claim 7, wherein the determining the lane change intention comprises:

photographing the driver's eyes by using an Infrared Rays (IR) light source configured to provide IR lighting and at least one IR camera;

determining the driver's pupil size and the gaze by analyzing a photograph image; and determining the lane change intention according to a change of the driver's pupil size and the gaze.

13. The method as claimed in claim 7, wherein the sensing the external object comprises sensing the external object by using at least one camera configured to photograph the peripheral region or at least one proximity sensor configured to sense an access status of the external object.

* * * * *